United States Patent
Lin et al.

(10) Patent No.: US 9,342,355 B2
(45) Date of Patent: May 17, 2016

(54) JOINT OPTIMIZATION OF MULTIPLE PHASES IN LARGE DATA PROCESSING

(71) Applicant: International Business Machines Corporation, Armonk, NY (US)

(72) Inventors: Minghong Lin, Pasadena, CA (US);
Jian Tan, Yorktown Heights, NY (US);
Li Zhang, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 292 days.

(21) Appl. No.: 13/922,746

(22) Filed: Jun. 20, 2013

(65) Prior Publication Data

US 2014/0380320 A1    Dec. 25, 2014

(51) Int. Cl.
*G06F 9/46* (2006.01)
*G06F 9/48* (2006.01)
*G06F 9/50* (2006.01)

(52) U.S. Cl.
CPC ............ *G06F 9/4881* (2013.01); *G06F 9/5066* (2013.01)

(58) Field of Classification Search
CPC .............................. G06F 9/4881; G06F 9/5066
USPC ................................................... 718/100, 102
See application file for complete search history.

(56) References Cited

U.S. PATENT DOCUMENTS

| | | | |
|---|---|---|---|
| 7,970,872 B2 | 6/2011 | Liu et al. | |
| 8,135,718 B1 | 3/2012 | Das et al. | |
| 8,209,695 B1 | 6/2012 | Pruyne et al. | |
| 8,230,070 B2 | 7/2012 | Buyya et al. | |
| 8,732,720 B2 * | 5/2014 | Verma et al. | 718/106 |
| 2003/0187907 A1 | 10/2003 | Ito | |
| 2007/0143765 A1 * | 6/2007 | Aridor et al. | 718/104 |
| 2008/0133474 A1 | 6/2008 | Hsiao et al. | |
| 2008/0263559 A1 | 10/2008 | Das et al. | |
| 2010/0094828 A1 * | 4/2010 | Mehta | G06F 9/5027 707/705 |
| 2010/0281166 A1 | 11/2010 | Buyya et al. | |
| 2010/0293551 A1 | 11/2010 | Ajima et al. | |
| 2011/0119680 A1 | 5/2011 | Li et al. | |

(Continued)

FOREIGN PATENT DOCUMENTS

| | | |
|---|---|---|
| WO | 2011153242 | 6/2011 |
| WO | 2012027478 | 8/2011 |

OTHER PUBLICATIONS

Polo, Jorda, et al., "Performance-Driven Task Co-Scheduling for MapReduce Environments", Network Operations and Management Symposium (NOMS), 2010 IEEE, Apr. 19-23, 2010, 8 pages, Osaka, Japan.

(Continued)

*Primary Examiner* — Meng An
*Assistant Examiner* — Willy W Huaracha
(74) *Attorney, Agent, or Firm* — Ference & Associates LLC (57) ABSTRACT

Methods and arrangements for task scheduling. A plurality of jobs is received, each job comprising at least a map phase, a copy/shuffle phase and a reduce phase. For each job, there are determined a map phase execution time and a copy/shuffle phase execution time. Each job is classified into at least one group based on at least one of: the determined map phase execution time and the determined copy/shuffle phase execution time. The plurality of jobs are executed via processor sharing, and the executing includes determining a similarity measure between jobs based on current job execution progress. Other variants and embodiments are broadly contemplated herein.

9 Claims, 3 Drawing Sheets

(56) References Cited

U.S. PATENT DOCUMENTS

| | | | |
|---|---|---|---|
| 2011/0154341 | A1 | 6/2011 | Pueyo et al. |
| 2011/0167149 | A1 | 7/2011 | Lee et al. |
| 2011/0282982 | A1 | 11/2011 | Jain |
| 2012/0042319 | A1 | 2/2012 | Hildrum et al. |
| 2012/0110047 | A1 | 5/2012 | Hildrum et al. |
| 2012/0151292 | A1 | 6/2012 | Rowstron et al. |
| 2012/0198466 | A1 | 8/2012 | Cherkasova et al. |
| 2012/0226639 | A1 | 9/2012 | Burdick et al. |
| 2012/0284727 | A1 | 11/2012 | Kodialam et al. |
| 2012/0330864 | A1 | 12/2012 | Chakrabarti et al. |
| 2013/0024012 | A1 | 1/2013 | Ballintine et al. |
| 2013/0024412 | A1 | 1/2013 | Gong et al. |
| 2013/0031558 | A1 | 1/2013 | Balmin et al. |
| 2013/0104135 | A1 | 4/2013 | Cai et al. |
| 2013/0104140 | A1 | 4/2013 | Meng et al. |
| 2013/0268941 | A1* | 10/2013 | Cherkasova .......... G06F 9/5066 718/104 |
| 2013/0290976 | A1* | 10/2013 | Cherkasova et al. .......... 718/104 |
| 2014/0019987 | A1 | 1/2014 | Verma et al. |
| 2014/0215487 | A1* | 7/2014 | Cherkasova et al. .......... 718/106 |

OTHER PUBLICATIONS

Teng, Fei et al., "Scheduling Performance of Real-Time Tasks on MapReduce Cluster," Proceedings of the International Conference on Human-centric Computing 2011 and Embedded and Multimedia Computing 2011, pp. 365-374, Springer Science+Business Media B.V., Netherlands, 2011.

Zaharia, Matei et al., "Job Scheduling for Multi-User MapReduce Clusters," Technical Report No. UCB/EECS-2009-55, Apr. 30, 2009, 18 pages, Electrical Engineering and Computer Sciences, University of California at Berkeley, available at: http://www.eecs.berkeley.edu/Pubs/TechRpts/2009/EECS-2009-55.pdf.

Anathanarayanan, G., et al., "Reining the Outliers in Map-Reduce Clusters using Mantri", Microsoft Research Technical Report, Jun. 2010, 24 pages, Techical Report MSR-TR-2010-69, Microsoft Corporation, Redmond, Washington, USA.

Dean, J., et al., "MapReduce: Simplified Data Processing on Large Clusters", Communications of the ACM, 50th Anniversary Edition, Jan. 2008, vol. 51, Issue 1, pp. 107-113, ACM, New York, New York, USA.

Hammoud, M., et al., "Locality-Aware Reduce Task Scheduling for MapReduce", 2011 IEEE Third International Conference on Cloud Computing Technology and Science (CloudCom), Athens, Greece, Nov. 29-Dec. 1, 2011, 7 pages, available online at http://www.qatar.cmu.edu/~mhhammou/mhh_msakr_LARTS_CloudCom2011_paper.pdf, as of Apr. 8, 2013.

Hindman, B., et al., "Mesos: A Platform for Fine-Grained Resource Sharing in the Data Center", Technical Report, University of California, Berkeley, Sep. 30, 2010, 14 pages, available online at http://mesos.berkeley.edu/mesos_tech_report.pdf, as of Apr. 8, 2013.

Isard, M., et al., "Dryad: Distributed Data-Parallel Programs from Sequential Building Blocks", 2nd ACM SiGOPS/EuroSys European Conference on Computer Systems, Mar. 21-23, 2007, 14 pages, ACM, Lisboa, Portugal.

Zaharia, M., et al., "Improving MapReduce Performance in Heterogeneous Environments", Proceedings of the 8th USENIX conference on Operating systems Design and Implementaion (OSDI'08), San Diego, California, USA, Dec. 8-10, 2008, 14 pages, available online at http://static.usenix.org/events/osdi08/tech/full_papers/zaharia/zaharia.pdf, as of Apr. 8, 2013.

Palanisamy, B., et al., "Purlieus: Locality-aware Resource Allocation for MapReduce in a Cloud", Proceedings of 2011 International Conference for High Performance Computing, Networking, Storage and Analysis, SC'11, Nov. 12-18, 2011, 11 pages, ACM, Seattle, Washington, USA.

Verma, A., et al., "ARIA: Automatic Resource Inference and Allocation for MapReduce Environments", HP Laboratories, Report HPL-2011-58, approved for publication in 8th IEEE International Conference on Autonomic Computing (ICAC'2011), Jun. 14-18, 2011, 11 pages, IEEE, Karsruhe, Germany.

Wolf, J., et al., "FLEX: A Slot Allocation Scheduling Optimizer for MapReduce Workloads", Middleware 2010, vol. 6452 of Lecture Notes in Computer Science, 20 pages, Springer Berlin/Heidelberg, Germany.

Zaharia, M., et al., "Job Scheduling for Multi-User MapReduce Clusters", Electrical Engineering and Computer Sciences, University of California at Berkeley, Technical Report, No. UCB/EECS-2009-55, Apr. 30, 2009, 14 pages, University of California At Berkeley, Berkeley, California, USA.

Lin, Jimmy et al., "Of Ivory and Smurfs: Loxodontan MapReduce Experiments for Web Search", Nov. 2009, TREC 2009 DTIC Document, 12 pages, University of Maryland, USA.

Wang, Xiaowei et al., "Dynamic Split Model of Resource Utilization in MapReduce", DataCloud-SC'11, Nov. 14, 2011, 10 pages, Seattle, Washington, USA.

Isard, Michael et al., "Quincy: Fair Scheduling for Distributed Computer Clusters", SOSP'09, Oct. 11-14, 2009, 16 pages, Big Sky, Montana, USA.

Zaharia, Matei et al., "Delay Scheduling a Simple Technique for Achieving Locality and Fairness in Cluster Scheduling", In Eurosys, Apr. 2010, 30 pages, Paris, France.

Dean, Jeffrey et al., "MapReduce: Simplified Data Processing on Large Clusters," OSDI'04 Technical Program, Oct. 3, 2004. available at http://db2.usenix.org/events/osdi04/tech/full_papers/dean/dean_html/ as of Apr. 2, 2013.

Derman, Cyrus et al., "A Sequential Stochastic Assignment Problem," Management Science, Mar. 1972, 8 pages, vol. 18, No. 7, Informs, Institute for Operations Research and the Management Sciences. Publisher contact http://www.jstor.org/action/showPublisher:publisherCode=informs.

Polo, Jorda et al., "Resource-aware Adaptive Scheduling for MapReduce Clusters," Proceedings of the 12th ACM/IFIP/USENIX International Conference on Middleware, Lisboa, Portugal, Dec. 12-16, 2011, 20 pages. available at http://people.ac.upc.edu/dcarrera/papers/MIDDLEWARE11.pdf as of Apr. 9, 2013.

Sandholm, Thomas et al., "Dynamic Proportional Share Scheduling in Hadoop," JSSPP 2010, pp. 110-131, Springer-Verlag Berlin Heidelberg, Germany.

Guo, Zhenhua et al., "Investigation of Data Locality in MapReduce," Proceedings of the 2012 12th IEEE/ACM International Symposium on Cluster, Cloud and Grid Computing, CCGRID'12, Ottawa, Canada, May 13-16, 2012, 8 pages. available at http://grids.ucs.indiana.edu/pt/iupages/publications/InvestigationDataLocalityInMapReduce_CCGrid12_Submitted.pdf as of Apr. 3, 2013.

Tan, Jian et al., "Performance Analysis of Coupling Scheduler for MapReduce/Hadoop," Proceedings IEEE INFOCOM, 2012, Orlando, Florida, USA, Mar. 25-30, 2012, 5 pages. available at http://www.chinacloud.cn/upload/2012-01/12011616302763.pdf as of Apr. 3, 2013.

Kavulya, Soila et al., "An Analysis of Traces from a Production MapReduce Cluster," CMU-PDL-09-107, Parallel Data Laboratory, Carnegie Mellon University, Dec. 2009, 18 pages, Carnegie Mellon University, Pittsburgh, Pennsylvania, USA.

Condie, Tyson et al., "MapReduce Online," Proceedings of the 7th USENIX Conference on Networked Systems Design and Implementation, NSDI'10, San Jose, California, USA, Apr. 28-30, 2010, 15 pages. available at http://db.cs.berkeley.edu/papers/nsdi10-hop.pdf as of Apr. 3, 2013.

Wang, Yandong, "Hadoop Acceleration Through Network Levitated Merge," SC11, Seattle, Washington, USA, Nov. 12-18, 2011, 10 pages, ACM Digital Library.

Dai, Jinquan et al., "HiTune: Dataflow-Based Performance Analysis for Big Data Cloud," Proceedings 3rd USENIX Workshop on Hot Topics in Cloud Computing, Portland, Oregon, USA, Jun. 14-15, 2011, 14 pages. available at http://static.usenix.org/events/atc11/tech/find_files/Dai.pdf as of Apr. 3, 2013.

(56) References Cited

OTHER PUBLICATIONS

Schwazkopf, Malte et al., "The seven deadly sins of cloud computing research," Proceedings HotCloud'12, 4th Usenix Workshop on Hot Topics in Cloud Computing, Boston, Massachusetts, USA, Jun. 12-13, 2012, 5 pages. available at https://www.usenix.org/conference/hotcloud12/seven-deadly-sins-cloud-computing research as of Apr. 3, 2013.

Chen, Fangfei et al., "Joint Scheduling of Processing and Shuffle Phases in MapReduce Systems," Proceedings of 31st Annual IEEE INFOCOM Conference, Orlando, Florida, USA, Mar. 25-30, 2012, pp. 1143-1151, IEEE Digital Library.

Ip.com, "Optimizing MapReduce Scheduling at the Task-Level," Prior Art Database Technical Disclosure, IPCOM000217108D, May 3, 2012, 6 pages.

Wierman, Adam et al., "Classifying Scheduling Policies with Respect to Unfairness in an M/GI/1." SIGMETRICS'03, San Diego, California, USA, Jun. 10-14, 2003, 12 pages, ACM Digital Library.

\* cited by examiner

FIG. 3

JOINT OPTIMIZATION OF MULTIPLE PHASES IN LARGE DATA PROCESSING

BACKGROUND

An effective framework involves distributed parallel computing, which operates to disperse processing tasks across multiple processors operating on one or more computing devices such that parallel processing may be executed simultaneously. Important implementations of large scale distributed parallel computing systems are MapReduce by Google®, Dryad by Microsoft®, and the open source Hadoop® MapReduce implementation. Google® is a registered trademark of Google Inc. Microsoft® is a registered trademark of the Microsoft Corporation in the United States, other countries, or both. Hadoop® is a registered trademark of the Apache Software Foundation.

Generally, MapReduce has emerged as a dominant paradigm for processing large datasets in parallel on compute clusters. As an open source implementation, Hadoop has become popular in a short time for its success in a variety of applications, such as social network mining, log processing, video and image analysis, search indexing, recommendation systems, etc. In many scenarios, long batch jobs and short interactive queries are submitted to the same MapReduce cluster, sharing limited common computing resources with different performance goals. It has thus been recognized that, in order to meet these imposed challenges, an efficient scheduler can be helpful if not critical in providing a desired quality of service for the MapReduce cluster.

BRIEF SUMMARY

In summary, one aspect of the invention provides a method comprising: utilizing at least one processor to execute computer code configured to perform the steps of: receiving a plurality of jobs, each job comprising at least a map phase, a copy/shuffle phase and a reduce phase; determining, for each job, a map phase execution time and a copy/shuffle phase execution time; classifying each job into at least one group based on at least one of: the determined map phase execution time and the determined copy/shuffle phase execution time; and executing the plurality of jobs via processor sharing; the executing comprising determining a similarity measure between jobs based on current job execution progress.

Another aspect of the invention provides an apparatus comprising: at least one processor; and a computer readable storage medium having computer readable program code embodied therewith and executable by the at least one processor, the computer readable program code comprising: computer readable program code configured to receive a plurality of jobs, each job comprising at least a map phase, a copy/shuffle phase and a reduce phase; computer readable program code configured to determine, for each job, a map phase execution time and a copy/shuffle phase execution time; computer readable program code configured to classify each job into at least one group based on at least one of: the determined map phase execution time and the determined copy/shuffle phase execution time; and computer readable program code configured to execute the plurality of jobs via processor sharing, via determining a similarity measure between jobs based on current job execution progress.

An additional aspect of the invention provides a computer program product comprising: a computer readable storage medium having computer readable program code embodied therewith, the computer readable program code comprising: computer readable program code configured to receive a plurality of jobs, each job comprising at least a map phase, a copy/shuffle phase and a reduce phase; computer readable program code configured to determine, for each job, a map phase execution time and a copy/shuffle phase execution time; computer readable program code configured to classify each job into at least one group based on at least one of: the determined map phase execution time and the determined copy/shuffle phase execution time; and computer readable program code configured to execute the plurality of jobs via processor sharing, via determining a similarity measure between jobs based on current job execution progress.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

For further background information, including details relating to at least one environment or context in which embodiments of the invention may be employed, incorporated herein by reference, as if set forth in its entirety herein, are co-pending and commonly assigned U.S. patent application Ser. No. 13/278,383 (entitled "Resource Aware Scheduling In a Distributed Computing Environment", filed Oct. 21, 2011, inventors Xiaoqiao Meng et al.) and Ser. No. 13/525,778, subsequently issued as U.S. Pat. No. 8,924,977 on Dec. 30, 2014, (entitled "Sequential Cooperation Between Map and Reduce Phases to Improve Data Locality", filed Jun. 18, 2012, inventors Xiaoqiao Meng et al.).

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Generally, in a context of at least one embodiment of the invention, it can be recognized that a key property of multiple phase processing is that the data transfer phase and the data processing phase can overlap each other. For instance, with respect to a MapReduce job, some pieces of its input data may have finished at the map phase, with corresponding intermediate data transferred to reduce tasks, while other pieces of input data are still at the map phase or have not yet started processing. Such phase overlapping makes multiple-phase large data processing different from traditional multi-stage processing (e.g., as may be encountered in a manufacturing environment), and thus renders traditional scheduling policies inefficient. Accordingly, broadly contemplated herein are methods and arrangements for effecting better performance, via coordinating scheduling decisions at the data transfer phase and the data processing phase.

In accordance with at least one embodiment of the invention, there are broadly contemplated herein scheduling algorithms which take phase overlapping into consideration. One principle involved in such algorithms includes scheduling smaller jobs early. In so doing, smaller jobs will not be blocked by larger jobs for an inordinately long time; thus, the average completion time can be reduced. Another principle includes running a mixture of processing-heavy jobs and transfer-heavy jobs together. In so doing, both data processing capacity and data transfer capacity can be better utilized.

In accordance with at least one embodiment of the invention, to schedule jobs at a data processing phase, their output data sizes are estimated. According to the ratio of the processing time required at current data processing phase and the data transfer time required at the following data transfer phase, jobs are classified into different classes. The data processing capacity and data transfer capacity are shared by different classes of jobs. For each class, jobs are sorted according to their job sizes and only the smaller ones are considered for processing, while the rest are queued in the system. Thus, the algorithms make two decisions, namely: resource allocation between classes of jobs, mixing processing-heavy jobs with transfer-heavy jobs; and job scheduling within each class of jobs, wherein smaller jobs are scheduled early.

Figure 1:
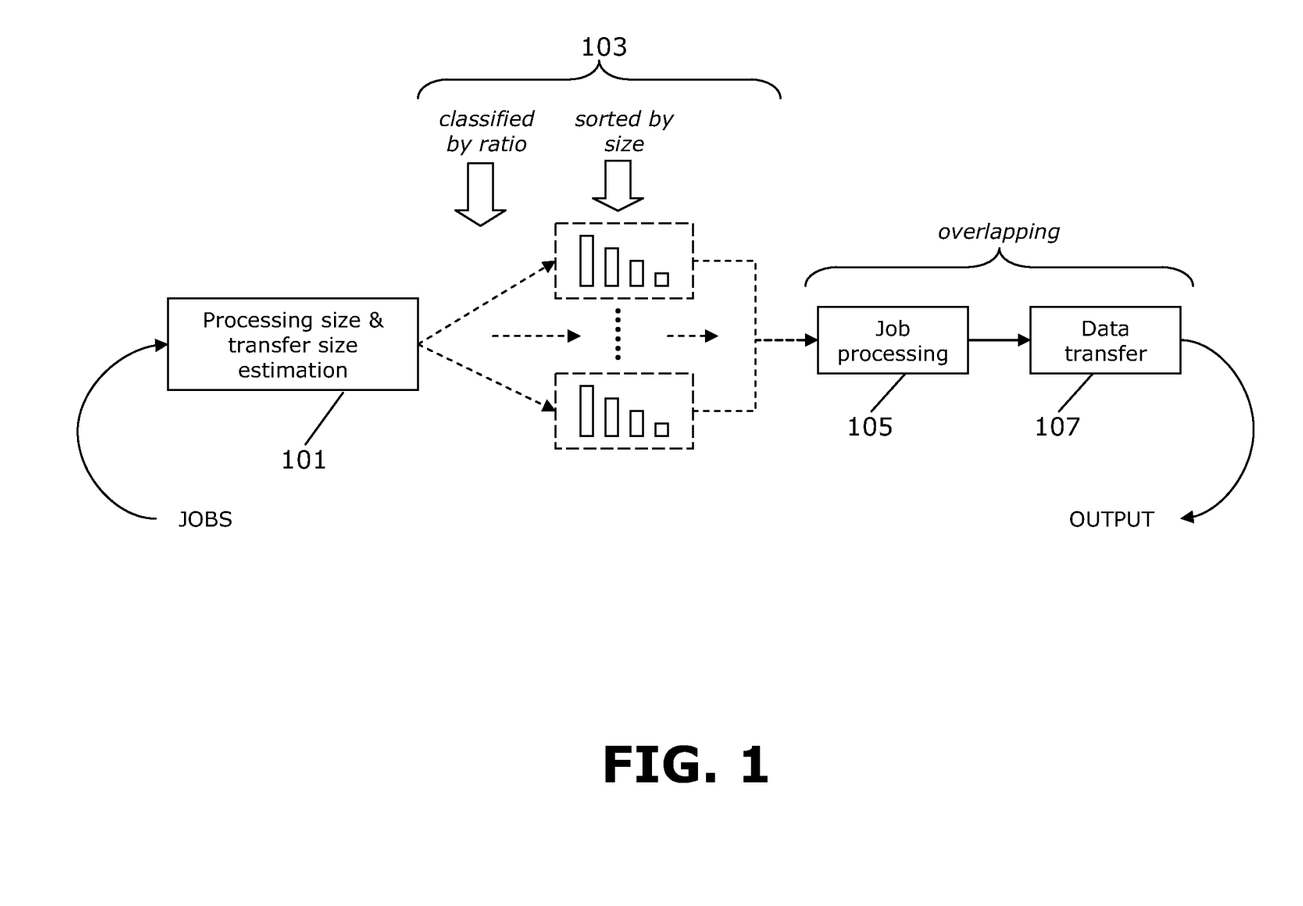
FIG. 1 graphically illustrates map and reduce task performance with a conventional scheduler.

FIG. 1 schematically illustrates a general data flow, in accordance with at least one embodiment of the invention. To start, a step 101 of estimating processing size and transfer size involves collecting job size information, which is used in resource allocation and job scheduling. Job size for a data processing phase can be characterized as the time a job spends on this phase alone, via using full data processing capacity. Job size for a data transfer phase can be characterized as the time a job spends on this phase alone, via using full data transfer capacity.

In accordance with at least one embodiment of the invention, the job size for a data processing phase can be estimated by consulting historical data of similar jobs, or by running a small fraction of the job and then using linear prediction. For example, in MapReduce, a job is usually split into many map tasks and reduce tasks. For each job, a few map tasks can be run to predict job size at the map phase and its job size at a copy/shuffle phase. (By way of an illustrative and non-restrictive example, one suitable approach for linear prediction involves measuring intermediate data generated from the first few finished map tasks and then using a linear model to estimate the total intermediate data. Such an approach, for background purposes, is discussed in M. Zaharia et al., "Improving MapReduce performance in heterogeneous environments," Proceedings of the 8th USENIX conference on Operating systems design and implementation (OSDI'08), 2008, pp. 29-42.)

In accordance with at least one embodiment of the invention, in a classification/sorting step 103, once the estimated job sizes for a data processing phase ($x_i$) and data transfer phase ($y_i$) are obtained, a job can then be classified based on the ratio $x_i/y_i$. This ratio represents whether a job is processing-heavy or transfer-heavy (depending on the relative strength of the numerator or denominator, respectively). For a given system, the jobs are classified into K types based on K−1 thresholds $r_1, \ldots r_{K-1}$. Jobs of each type are placed in a queue, where the jobs are sorted in ascending order by job size. (Thus, in FIG. 1, for illustrative purposes, smaller-sized jobs are shown towards the right of the drawing, prior to being fed to job processing and data transfer.) Owing to multiple phases, it should be understood that the job size for a job is not represented simply by number but by a vector, with each entry in the vector representing the job size for a given phase. (As such, depending on the application and obtained measurements, the job size may be represented by a one-dimensional real valued number, or a vector that contains multiple dimensional measurements.)

In accordance with at least one embodiment of the invention, for each queue, the remaining job size vector (i.e., that portion of the vector constituted by entries for phases still to be run) is mapped to a single number, and jobs are sorted in ascending order, based on this number. Different queues may potentially employ different mapping methods. Illustrative examples of such methods include, but by no means are limited to, vector seminorms defined on the job size vector, such as infinity-norm $\|\bullet\|_\infty$, which is equal to the maximum entry, and $l_1$-norm, $\|\bullet\|_1$, which is equal to the sum of all entries. For those systems that do not support task/job pre-emptions (meaning that a task cannot yield unless it is finished), mapping can be based on the original job size vector instead of the remaining job size vector.

In accordance with at least one embodiment of the invention, a job processing step 105 proceeds as follows. Generally, it can be recognized that larger-scale data processing systems like MapReduce are usually able to process multiple jobs simultaneously. Thus, in accordance with at least one scheduling algorithm broadly contemplated herein, a data processing phase (or data transfer phase) can process (or transfer output data of) multiple jobs from different queues, or the same queues, simultaneously. Based on the aforementioned principle of scheduling smaller jobs earlier, one embodiment is to let the first M jobs in each queue be considered for processing, inasmuch as jobs are sorted in ascending order in each queue by job size defined by a given mapping function. The resource allocation between queues and jobs at the data processing phase can then involve multi-class scheduling disciplines, e.g., Discriminatory Processor-Sharing and Generalized Processor-Sharing, or even single-class scheduling disciplines like Shortest Remaining Processing Time first (SRPT), in which queues serve as classes that job size are defined in different ways based on the ratio $x_i/y_i$. (For background purposes, scheduling disciplines such as these are discussed in A. Wiereman and M. Harchol-Balter, "Classifying Scheduling Policies with Respect to Unfairness in an M/GI/1," *SIGMETRICS* '03, Jun. 10-14, 2003, San Diego.)

In accordance with at least one embodiment of the invention, a data transfer step 107 proceeds as follows. Generally, a similar concept as discussed above for job processing 105 can also be applied here, with respect to resource allocation between queues and jobs at a data transfer phase. As such, the data transfer phase 107 can overlap with a previous data processing phase 105, wherein a job can be scheduled with respect to both phases simultaneously. The only constraint here would be that progress in the data transfer phase 107 cannot be faster than that on its corresponding previous data processing phase 105. Thus, resources allocated to a job in data transfer phase 107 may not be used completely due to a general data availability constraint. In this case, a spare resource can be shared by or reallocated to other jobs.

In accordance with at least one embodiment of the invention, in the data transfer phase 107, a resource is allocated to different jobs such that the second phase of a job matches with the speed of the first phase of the same job. In the MapReduce framework in particular, allocating too many resources to the copy/shuffle phase without considering the speed at which the intermediate data are generated will lead to resource underutilization.

As such, as broadly contemplated herein, in accordance with at least one embodiment of the invention, other jobs may be served when the copy/shuffle phase of a running job becomes idle due to a lack of sufficient intermediate data. When a job does not have enough intermediate data to fetch, it can yield the resource to other jobs. Particularly, for each ordered list of the tasks that have been computed, since the intermediate data may not be available yet due to the dependency between map and reduce phase, it may be desirable to skip some of the idle tasks and attend to other tasks, even though the idle tasks may have a higher priority.

Alternatively, in accordance with at least one embodiment of the invention, such a process can be performed via allocating the pool of threads that are responsible for fetching intermediate data. Generally, each copy/shuffle phase of a reduce task is assigned with a fixed number of threads for fetching intermediate data. Following the idea of matching speeds of different phases of the workflow, there can be a dynamic allocation of a number of threads to each reduce tasks. For example, the number of threads can be allocated in proportion to the speed at which the intermediate data can be generated for each job.

The disclosure now turns to sample implementations in accordance with at least one embodiment of the invention. In accordance with an algorithm in one implementation, let K=1 such that there is only one queue. The jobs are sorted by job size, which is defined by mapping function $L_i(t)=\max(x_i(t), y_i(t))$ for job i at time t, where $x_i(t)$ represents the remaining size of the job for a current data processing phase, and $y_i(t)$ represents the remaining size of the job for the following data transfer phase. Intuitively, $L_i(t)$ represents the time for job i to go through these two phases if full capacity is used. Then, let M=1 such that the data processing phase works only on the smallest job and the data transfer phase serves to transfer only the output data of the smallest job. Basically, this scheduling algorithm is to mimic the SRPT policy (see Wiereman and Harchol-Balter, supra) but adapted to work in two overlapping phases.

In accordance with an algorithm in another implementation, in accordance with at least one embodiment of the invention, let K=2 with $r_1=1$, such that jobs are classified into two queues as to whether $x_i \geq y_i$ or $x_i < y_i$. Again, the jobs are sorted by job size which is defined by mapping function $L_i(t)=\max(x_i(t), y_i(t))$ for job i at time t. Let M=1 such that the data processing phase works only on the smallest job in each queue, and the data transfer phase serves to transfer only the output data of the smallest job in each queue. Assuming there are two queues (by way of example), each queue uses half-resources (or partial resources) if both queues have jobs, or a queue can use all resources in the event that the other queue is empty. In other words, in considering the number of available computing slots per queue (e.g., the number of map/reduce slots on each node), the amount or degree of resources used (e.g., none, partial or full) can be tailored to the availability of computing slots.

Figure 2:
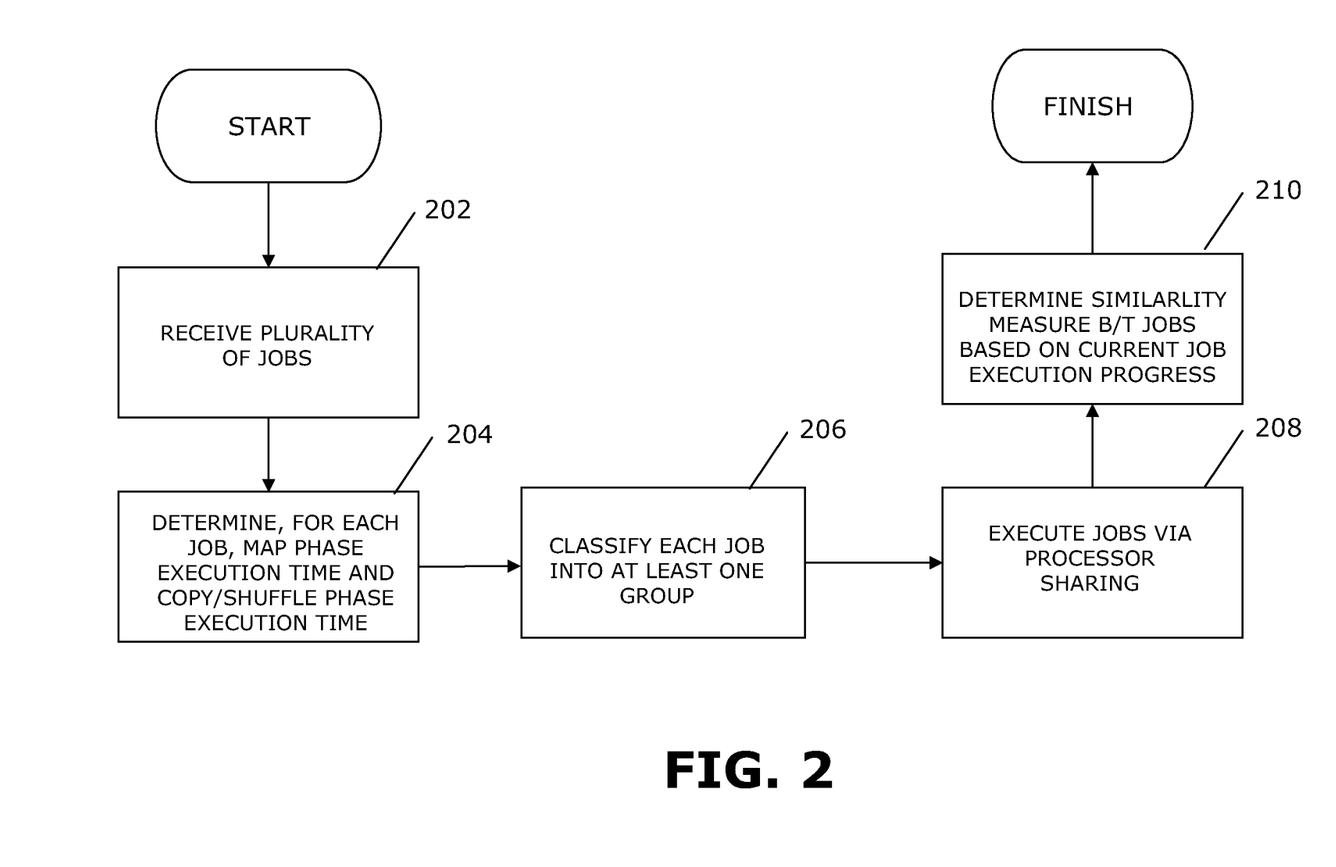
FIG. 2 sets forth a process more generally for task scheduling.

FIG. 2 sets forth a process more generally for task scheduling, in accordance with at least one embodiment of the invention. It should be appreciated that a process such as that broadly illustrated in FIG. 2 can be carried out on essentially any suitable computer system or set of computer systems, which may, by way of an illustrative and non-restrictive example, include a system such as that indicated at 12' in FIG. 3. In accordance with an example embodiment, most if not all of the process steps discussed with respect to FIG. 2 can be performed by way a processing unit or units and system memory such as those indicated, respectively, at 16' and 28' in FIG. 3.

As shown in FIG. 2, in accordance with at least one embodiment of the invention, a plurality of jobs is received, each job comprising at least a map phase, a copy/shuffle phase and a reduce phase (202). For each job, there are determined a map phase execution time and a copy/shuffle phase execution time (204). Each job is classified into at least one group based on at least one of: the determined map phase execution time and the determined copy/shuffle phase execution time (206). The plurality of jobs are executed via processor sharing (208), and the executing includes determining a similarity measure between jobs based on current job execution progress (210).

Figure 3:
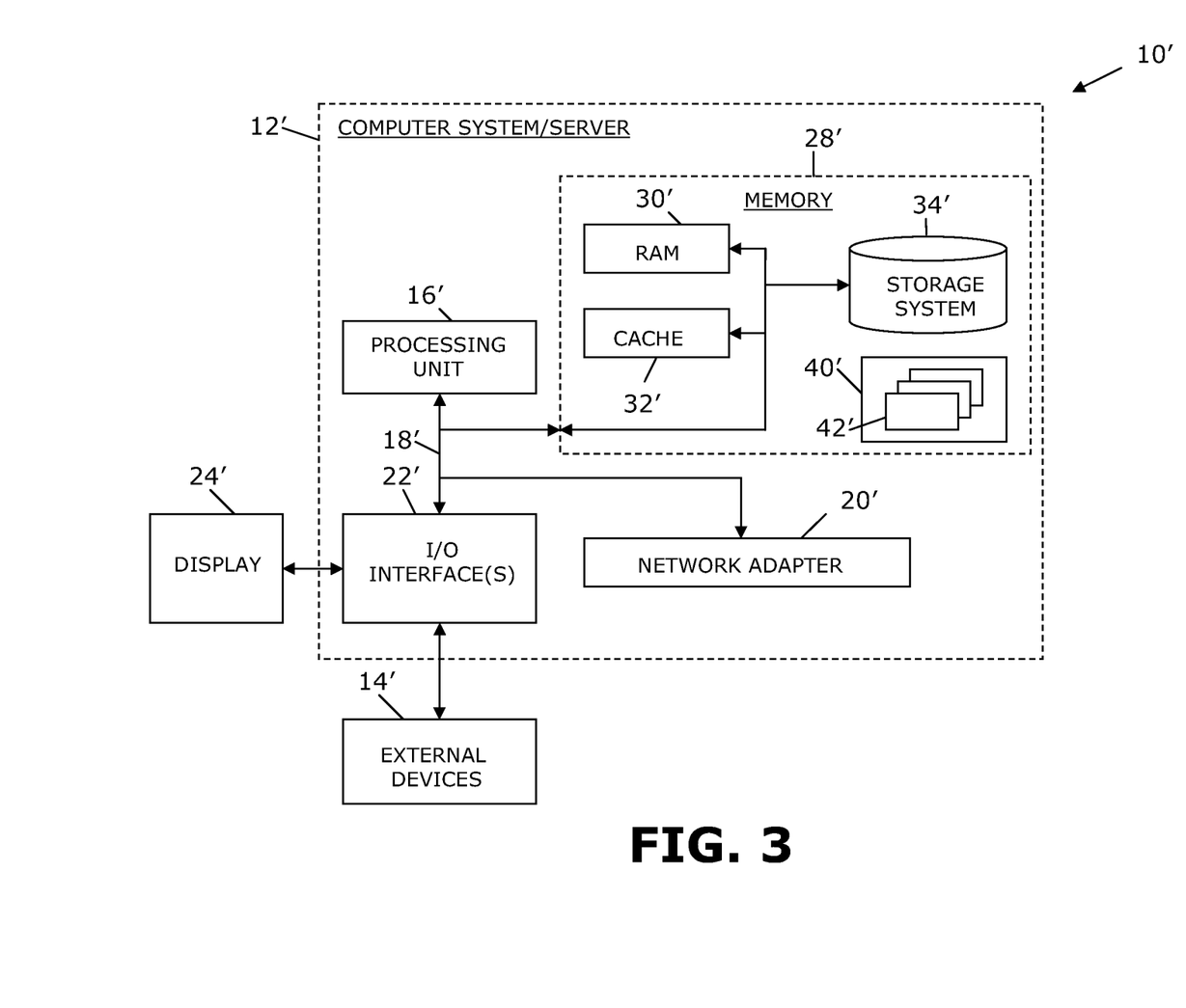
FIG. 3 illustrates a computer system.

Referring now to FIG. 3, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD- ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
utilizing at least one processor to execute computer code configured to perform the steps of:
receiving a plurality of jobs, each job comprising at least a map phase, a copy/shuffle phase and a reduce phase;
determining, for each job, a map phase execution time and a copy/shuffle phase execution time;
classifying the plurality of jobs into one or more groups, wherein at least one group of the one or more groups comprises jobs having a greater map phase execution time than a copy/shuffle phase execution time and wherein at least another group of the one or more groups comprises jobs having a greater copy/shuffle phase execution time than map phase execution time;
sorting the jobs classified within the at least one group and the jobs classified within the at least another group in ascending order of overall job execution time; and
executing the map phase and the copy/shuffle phase of the jobs classified within the at least one group and the at least another group via processor sharing, wherein executing comprises allocating resources such that a resource capacity of each of the map phase and the copy shuffle phase is shared between the jobs classified within the at least one group and the at least another group, wherein allocating resources at the copy/shuffle phase further comprises allocating resources to a job such that a progress at the copy/shuffle phase of the job matches a progress at the map phase of the job, and wherein executing further comprises allocating the resources to each of the map phase and copy/shuffle phase so that a job having the smallest overall job execution time in each group is processed first.

2. The method according to claim 1, wherein said classifying comprises classifying each job into at least one group based on similarity with respect to the at least one of: the determined map phase execution time and the determined copy/shuffle phase execution time.

3. The method according to claim 1, wherein said classifying comprises classifying each job into at least one group based on similarity with respect to a ratio of the determined map phase execution time to the determined copy/shuffle phase execution time.

4. The method according to claim 1, wherein said executing comprises:
splitting at least one phase of at least one job into at least two portions; and
executing the at least two portions at different times.

5. An apparatus comprising:
at least one processor; and
a non-transitory computer readable storage medium having computer readable program code embodied therewith and executable by the at least one processor, the computer readable program code comprising:
computer readable program code configured to receive a plurality of jobs, each job comprising at least a map phase, a copy/shuffle phase and a reduce phase;
computer readable program code configured to determine, for each job, a map phase execution time and a copy/shuffle phase execution time;
computer readable program code configured to classify the plurality of jobs into one or more groups, wherein at least one group of the one or more groups comprises jobs having a greater map phase execution time than a copy/shuffle phase execution time and wherein at least another group of the one or more groups comprises jobs having a greater copy/shuffle phase execution time than map phase execution time;
computer readable program code configured to sort the jobs classified within the at least one group and the jobs classified within the at least another group in ascending order of remaining job execution time; and
computer readable program code configured to execute the map phase and the copy/shuffle phase of the jobs classified within the at least one group and the at least another group via processor sharing, wherein executing comprises allocating resources such that a resource capacity of each of the map phase and the copy shuffle phase is shared between the jobs classified within the at least one group and the at least another group, wherein allocating resources at the copy/shuffle phase further comprises allocating resources to a job such that a progress at the copy/shuffle phase of the job matches a progress at the map phase of the job, and wherein executing further comprises allocating the resources to each of the map phase and copy/shuffle phase so that a job having the smallest overall job execution time in each group is processed first.

6. A computer program product comprising:
a non-transitory computer readable storage medium having computer readable program code embodied therewith, the computer readable program code comprising:
computer readable program code configured to receive a plurality of jobs, each job comprising at least a map phase, a copy/shuffle phase and a reduce phase;
computer readable program code configured to determine, for each job, a map phase execution time and a copy/shuffle phase execution time;
computer readable program code configured to classify the plurality of jobs into one or more groups, wherein at least one group of the one or more groups comprises jobs having a greater map phase execution time than a copy/shuffle phase execution time and wherein at least another group of the one or more groups comprises jobs having a greater copy/shuffle phase execution time than map phase execution time;
computer readable program code configured to sort the jobs classified within the at least one group and the jobs classified within the at least another group in ascending order of remaining job execution time; and
computer readable program code configured to execute the map phase and the copy/shuffle phase of the jobs classified within the at least one group and the at least another group via processor sharing, wherein executing comprises allocating resources such that a resource capacity of each of the map phase and the copy shuffle phase is shared between the jobs classified within the at least one group and the at least another group, wherein allocating resources at the copy/shuffle phase further comprises allocating resources to a job such a progress at that the copy/shuffle phase of the job matches a progress at the map phase of the job, and wherein executing further comprises allocating the resources to each of the map phase and copy/shuffle phase so that a job having the smallest overall job execution time in each group is processed first.

7. The computer program product according to claim 6, wherein said computer readable program code is configured to classify each job into at least one group based on similarity with respect to the at least one of: the determined map phase execution time and the determined copy/shuffle phase execution time.

8. The computer program product according to claim 6, wherein said computer readable program code is configured to classify each job into at least one group based on similarity with respect to a ratio of the determined map phase execution time to the determined copy/shuffle phase execution time.

9. The computer program product according to claim 6, wherein said computer readable program code is configured to:
split at least one phase of at least one job into at least two portions; and
execute the at least two portions at different times.

* * * * *